United States Patent [19]

Harrington et al.

[11] 3,940,255

[45] Feb. 24, 1976

[54] PROCESS FOR MAKING CORDIERITE GLASS-CERAMIC HAVING NUCLEATING AGENT AND INCREASED PERCENT CORDIERITE CRYSTALLINITY

[75] Inventors: Roy V. Harrington, Brecksville; Donald F. Beal, Medina, both of Ohio

[73] Assignee: Ferro Corporation, Cleveland, Ohio

[22] Filed: Aug. 5, 1974

[21] Appl. No.: 494,737

[52] U.S. Cl. .................. 65/33; 106/39.6; 106/39.7; 106/39.8
[51] Int. Cl.² .......................................... C03C 3/22
[58] Field of Search................ 106/39.6, 39.7, 39.8; 65/33; 264/125

[56] References Cited
UNITED STATES PATENTS

| | | | |
|---|---|---|---|
| 2,920,971 | 1/1960 | Stookey | 106/39.6 |
| 3,113,877 | 12/1963 | Janakirama-Rao | 106/39.6 |
| 3,275,493 | 9/1966 | MacDowell | 65/33 |
| 3,282,711 | 11/1966 | Lin | 65/33 |
| 3,389,458 | 6/1968 | Ostrander et al. | 106/48 |
| 3,450,546 | 6/1969 | Stong | 65/33 |
| 3,464,806 | 9/1969 | Seki et al. | 65/33 |
| 3,464,880 | 9/1969 | Rinehart | 65/33 X |
| 3,473,936 | 10/1969 | Smith | 65/33 |
| 3,480,452 | 11/1969 | Fleischner | 264/125 |
| 3,775,164 | 11/1973 | Smith et al. | 65/33 |

FOREIGN PATENTS OR APPLICATIONS

| | | | |
|---|---|---|---|
| 1,020,573 | 2/1966 | United Kingdom | 106/39.6 |
| 1,082,016 | 5/1960 | Germany | 106/39.7 |
| 1,085,804 | 1/1961 | Germany | 106/39.7 |
| 1,099,135 | 2/1961 | Germany | 106/39.7 |

*Primary Examiner*—Helen M. McCarthy
*Attorney, Agent, or Firm*—Milton L. Simmons; Wesley B. Taylor

[57] ABSTRACT

A cordierite-type glass-ceramic and a process for its preparation are disclosed, characterized in that a nucleating agent in a small amount is added preferably to a glass batch capable of producing cordierite. The nucleating agent aids in forming a glass-ceramic refractory of relatively large amounts of crystalline cordierite. The melt is quenched and ground to an average particle size no greater than about minus 325 U.S. Standard sieve. This particle size in combination with a relatively small amount of a nucleating agent has been found to increase the amount of cordierite formed during crystallization and simultaneously decrease the amount of glassy phase remaining in the glass-ceramic. In this manner, the ultimate product more nearly resembles pure cordierite. The nucleating agent includes the compounds, usually the oxides, of Mo, Ta, Zr, Nb, Ti, Li, As, and mixtures thereof. The preferred nucleating additive or agent is $Nb_2O_5$. The present refractories may have a coefficient of thermal expansion less than $1.60 \times 10^{-6}$ inch/inch/°C from room temperature to about 600°C as determined by the Orton dilatometer.

8 Claims, No Drawings

PROCESS FOR MAKING CORDIERITE GLASS-CERAMIC HAVING NUCLEATING AGENT AND INCREASED PERCENT CORDIERITE CRYSTALLINITY

BACKGROUND OF THE INVENTION

Cordierite is a crystalline mineral that is desired for its physical properties, especially its relatively low rate of thermal expansion. Cordierite occurs naturally in certain rocks, but it is difficult to obtain substantially pure cordierite from this source and virtually impossible on a commercial basis.

Accordingly, the practice has been to synthesize cordierite. The crystalline structure of this mineral is generally taken theoretically to be a solid solution consisting essentially of the following oxides in the molar ratio: $2MgO.2Al_2O_3.nSiO_2$, $n$ being a whole number within the range of 5 to 8. As indicated, the cordierite lattice can accept 5 to 8 moles of $SiO_2$ with respect to the ratio given to provide a thermal expansion only slightly higher than that of the molar ratio 2:2:5, respectively. Beyond the molar ratio of 2:2:8 crystal composition, no further silica is accepted and cristobalite inversion appears in the expansion curves; note "Thermal Expansion of Some Glasses in the System $MgO-Al_2O_3-SiO_2$" by Hummel and Reid, Journal of the American Ceramic Society, Volume 34, No. 10, October, 1951, page 319. Beyond the indicated saturation limit for silica, the presence of free silica is indicated as by changes in the thermal expansion curves.

Although, as indicated, cordierite is considered to have a basic chemical composition, $2MgO.2Al_2O_3.nSiO_2$, there is evidence of limited solid solutions in cordierite toward the theoretical compound "Mg-beryl" ($3MgO.Al_2O_3.6SiO_2$), and also between cordierite and silica to the composition $2MgO.2Al_2O_3.nSiO_2$, where $n$ can be any whole number from 5 to 8. The complex nature of the proposed solid solutions and the long times that may be required to reach equilibrium in compositions of this type have resulted in conflicting opinions as to whether these solid solutions were stable or metastable at room temperature.

The crystal structure of cordierite is similar to the structure of the mineral beryl which consists of six-membered silicon-oxygen tetrahedron rings. Because of the differences in chemical composition between beryl and cordierite, the six-membered rings in the cordierite structure consist of one $(AlO_4)^{-5}$ group and five $(SiO_4)^{-4}$ groups. The differences between the two forms of cordierite, high or disordered cordierite and low or ordered cordierite, lie in the degree of order in the distribution of these aluminum-oxygen tetrahedra in the structure. High cordierite, with hexagonal symmetry, is found in nature as the mineral indialite and is most commonly associated with volcanic structures. Low cordierite has orthorhombic symmetry and is most commonly found in metamorphic rocks where the greatest degree of ordering in the cordierite crystal structure is achieved.

Modified cordierite structures also exist including a series of solid solutions between $2MgO.2Al_2O_3.5SiO_2$ and $2FeO.2Al_2O_3.5SiO_2$, between $2MgO.2Al_2O_3.5SiO_2$ and $2MnO.2Al_2O_3.5SiO_2$, and ostensibly between $2FeO.2Al_2O_3.5SiO_2$ and $2MnO.2Al_2O_3.5SiO_2$. All these compositions maintain the cordierite crystal structure and also may display the same attractive physical and thermal properties as previously described for magnesian cordierite.

The term "cordierite-type" is used here and in the claims to include any and all of the cordierite crystalline structures previously described.

Cordierite may be synthesized either through a solid state reaction of metal oxides or by recrystallization from a glass. In either case, high cordierite always forms first. Some degree of structural ordering of the alumina-oxygen tetrahedra can be achieved by prolonged heat treatment of high cordierite at elevated temperatures. In the formation of cordierite with the composition $2MgO.2Al_2O_3.5SiO_2$, by recrystallization from a glass, there are three important reactions which occur. An endothermic reaction at about 800°C indicates a point where relaxation in the glass structure occurs, thereby allowing ionic mobility and the formation of nuclei or sites for subsequent crystallization at higher temperatures. An exothermic reaction representing the formation of beta quartz solid solution crystal phase occurs at about 950°C. It is believed that there is a replacement of part of the silicon atoms in the crystal lattice of beta quartz by aluminum atoms and the corresponding filling of the spiral-like vacancies with magnesium atoms. The formation of high cordierite at the expense of beta quartz solid solution and most of the remaining glass is detected as an exothermic reaction occurring at about 1020°C. Heating to temperatures up to about 1425°C, depending on chemical purity of the starting glass, ensures maximum cordierite formation for that particular glass composition.

In one process for synthesizing cordierite, the oxides, $MgO$, $Al_2O_3$, and $SiO_2$, or batch materials yielding these oxides upon firing, such as talc and clay or other aluminum silicates, are smelted and then quenched to a solid glass. A desired article may be shaped from the glass melt prior to a rapid cooling. The glass or preformed article is then reheated to a crystallizing temperature in which cordierite is formed in situ. Unfortunately, the entire mass of solid glass does not convert to cordierite, such that there is coexistence of crystalline cordierite and a glassy phase. The presence of the glassy phase militates against realization in the glass-ceramic the desirable properties of cordierite, the more glassy phase being present, the more serious becomes the problem. While the glassy phase when fluid tends to densify the cordierite, in the resulting glass-ceramic the crystalline cordierite and vitreous glassy phase compete to dominate its physical properties. Glass-ceramics with the lowest residual glass have also the lowest coefficients of thermal expansion.

Attempts have, therefore, been made to increase the amount of cordierite that crystallizes, and thereby reduce the amount of glassy phase formed, by adding nucleating agents to the glass-forming batch. Previously, the amounts added, however, have been relatively large, for example, in the case of titania of the order of at least 5 to as much as 10% by weight and in some instances as much as 20% based on the weight of the glass. While such additives may have increased the crystallization of cordierite, their presence in such relatively large quantities has acted as a diluent or poison to the cordierite insofar as realizing the desired physical properties is concerned. For instance, the rate of thermal expansion unduly suffers. Use of significant amounts of such agents may also promote formation of crystalline systems other than the desired cordierite-type glass-ceramic.

In this respect, prior nucleating agents have a built-in counter-effect which at least in part negates any improvement that may have been realized in increasing crystallization to cordierite.

SUMMARY OF THE INVENTION

The principal object of the present invention is to provide a cordierite-type glass-ceramic having a low rate of thermal expansion for cordierite-glass mixed phases. This is realized by the use of relatively small amounts of a nucleating agent in combination with finely ground glass of potential cordierite composition. The combination increases the formation of crystalline cordierite at a crystallizing temperature and thereby decreases the attendant amount of glassy phase formed or left during the formation of cordierite.

In the case of bulk glass, crystallization to a cordierite-type glass-ceramic initiates at sites largely at the surface and propagates inwardly. Large crystal sizes and large amounts of residual glass result. However, when the glass is ground to fine particle size in accordance with the present invention and then preferably shaped as may be desired, the same crystallization occurs; but in combination with relatively small amounts of a nucleating agent and the vastly increased surface area, a greatly increased number of nucleating sites are born. A higher degree of crystallization to a cordierite-type glass-ceramic eventually results in which the sizes of the crystals are advantageously limited by the size of the original glass particles. That residual glass which does remain is also appreciably reduced in amount than would otherwise be the case.

In one form of the invention, a glass batch capable of yielding a melt consisting essentially of MgO, $Al_2O_3$, and $SiO_2$ is melted together with up to about 3% by weight of the glass to be formed of a nucleating agent. The agent is a metal compound, usually the oxide, in which the metal is selected from a class consisting of Mo, Ta, Zr, Ti, Li, As and mixtures thereof. The melt is quenched to a solid glass and the glass then ground to an average particle size of minus 325 U.S. Standard sieve. The large surface area afforded by the small particle sizes enables the use of a much smaller amount of nucleating agent than previously has been thought possible to achieve the desired results. In fact, especially small amounts, up to 0.5% by weight, have been found to be especially useful in the case of Ti, Nb, Mo, or Zr. The admixture of the glass particles and nucleating agent is formed into a desired shape and then heated to a nucleating temperature, such as from about 700° to about 900° C, for a time sufficient to form a plurality of crystallization sites, such as about 1 hour to about 4 hours.

The actual role of the nucleating agent is not clear. In some manner, the relatively small amount of nucleating agent is still effective in forming many centers or sites of nucleation for forming crystalline cordierite. There results a relatively large number of tiny and randomly oriented crystals which grow ever larger to a desirable maximum size. In this manner, the growth of crystalline cordierite is encouraged with the simultaneous reduction in the amount of a residual glassy phase. The cordierite-type glass-ceramic is then formed by heating at a still higher, crystallizing temperature, for example, from about 1000° to about 1200°C for about 1 hour to about 5 hours.

Cordierite-type glass-ceramics of the present invention contain at least 80 percent by weight of a cordierite-type crystalline structure and have a coefficient of thermal expansion less than about $1.60 \times 10^{-6}$ inch/inch/°C from room temperature (15° to 30°C) to about 600°C, as compared to about $2.5 \times 10^{-6}$ inch/inch/°C usually found in cordierite-type bodies, and as compared to about $1 \times 10^{-6}$ inch/inch/°C as found in pure polycrystalline cordierite, all as measured on the Orton dilatometer.

The present refractories are adapted for use at high temperatures, thermal shock conditions, such as in heat exchangers, for example, for gas turbine engines, in radome applications, for plates, rods, tubes, and the like.

DESCRIPTION OF THE PREFERRED EMBODIMENTS

In one form of the invention, batch materials are fused to form a glass melt containing sufficient amounts of MgO, $Al_2O_3$, and $SiO_2$ to engender the cordierite composition. For example, the batch materials may contain the following components or materials adapted to yield such components upon smelting: 10 to 30% MgO, 15 to 50% $Al_2O_3$, and 35 to 70% $SiO_2$. The theoretical formula $2MgO.2Al_2O_3.5SiO_2$ corresponds to a composition of 13.8% MgO, 34.9% $Al_2O_3$, and 51.3% $SiO_2$. Smelting may be carried out at 1500° to 1700°C for 1 to 6 hours, although values outside these ranges can also be used.

The nucleating agent may be added at any time prior to reheating the glass that is formed to a nucleating temperature. For example, the nucleating agent may be added to the glass at the time it is ground, as hereinafter described, either before, during, or after the glass is ground. In this case, the necleating agent is ground to the same average particle size as the glass. However, for convenience and better dispersion of the nucleating agent throughout the glass, it is preferred to add the agent directly to the original batch materials and to be smelted with them. In any case, a sufficient amount of nucleating agent is added to provide no more than about 3% by weight of the glass. In fact, for certain of the nucleating agents, extremely small amounts have been found to be effective. More particularly, for Ti, Nb, Mo or Zr, as little as up to 0.5% of the nucleating agent is surprisingly effective.

After the glass melt is formed from the batch materials, it is quenched, preserving the non-crystalline, glassy phase, and the resulting solid glass then conventionally ground to an average particle size of minus 325 U.S. Standard sieve (that is, finer than 44 microns) and preferably up to about five microns. It is postulated that the relatively large surface area of the particles provide high energy surfaces. The particle size therefore is significant in the practice of the present invention. The resulting ground glass becomes the raw material for fabricating the ceramic product of the invention.

The ground glass particles are formed into a desired article shape by standard techniques, such as dry pressing, casting, extruding, injection molding, or other powder fabrication techniques. In a subsequent heating operation to a nucleating temperature, the nucleating agent in combination with the fine particle size promote an increase in number of nucleating sites for more efficient nucleation.

The ultimate crystal size is ideally limited by the size of the glass particles and also by the large number of crystals which grow simultaneously. It is thought that the nucleating agents encourage the formation of more sites for crystallization, thereby resulting in greater crystallinity. The times and temperatures for the nucleating step can be developed by trial and error. However, heating for about 1 hour to about 4 hours in a range of about 700° to about 900°C has been found to be satisfactory. The nucleation at this stage may largely be on the surfaces of the glass particles. It is believed that many nucleation sites become available, resulting in an overall finer crystal size in the refractory body.

Thereafter, the article shape can be heated at a still higher temperature in a suitable furnace such as a muffle furnace to promote crystallization to the cordierite-type refractory. For instance, the second heat may be for about 0.5 hour to about 6 hours with a range of about 1050° to about 1425°C. Both the nucleating and crystallizing steps are a function of time and temperature. Refractory products of the present invention contain at least 80% by weight of a cordierite-type crystalline structure. The glass-ceramic may then be allowed to cool with the furnace.

The original chemical composition of the batch materials may vary widely as is understood in the art. The batch materials may comprise various materials, either oxides or other compounds which on being heated are converted to the desired oxide composition. In place of the oxides, other relatively easily decomposed compounds of magnesium, aluminum, and silica can be used such as the carbonates, sulfates, nitrates, silicic acid, and the like.

In a like manner, the metal compound defining the nucleating agent can vary in chemical composition as long as it is one convertible by heat to the oxide as during smelting or, additionally, in the case of lithium, in the form of the fluoride. Thus, the term "metal compound" as used herein to designate the necleating agent includes, as a starting additive, the metal in free metal form, or its oxide, or a form decomposable to the oxide or additionally in the case of lithium, lithium fluoride.

In general, following the procedure just outlined provides products of the present invention having the following typical properties:

Modulus of Rupture  2,000 to 25,000 psi
Coefficient of      Less than $1.60 \times 10^{-6}$ inch/inch/°C,
Thermal Expansion   from 0°C to 600°C as determined by the Orton dilatometer
Porosity            5% to 40%
Cordierite-type
Crystalline Content  At least 80% by weight At least the metal of the nucleating agent may remain in the ultimate refractory, normally as the oxide or additionally, in the case of lithium, as the fluoride.

The following examples are intended only to illustrate the invention and should not be construed as imposing limitations on the claims. Compositions are by weight percent and temperature is on the centigrade scale unless otherwise indicated.

EXAMPLES 1 THROUGH 9

Using commercially available raw materials, nine different batch compositions as shown in Table A were prepared and melted in platinum crucibles. Calcined magnesite was used as the source of the MgO, while calcined alumina was used as a source of the $Al_2O_3$. Pennsylvania powdered glass sand was used to provide the $SiO_2$, and reagent grade chemicals were used as a source of the nucleating agents which were included directly in the batch formulations.

All glasses were water quenched to guard against possible devitrification which could occur on a slow quench. Where necessary, all resulting glasses were crushed and remelted until no unmelted material was visible. The quenched glasses were then ball milled to an average particle size no greater than about minus 325 U.S. Standard sieve. Each composition of Table A was prepared and processed in the same manner. Press mixes were prepared by adding to a predetermined amount of glass particles about 4% by weight of polyethylene glycol dissolved in denatured ethyl alcohol. After drying, the samples were passed through a 42 mesh screen and about 1.5 weight percent of oleic acid was added and thoroughly blended with the press mixes. A bar sample was then prepared from each composition under test by pressing 15 grams of the glass particles at 5,000 psi in a die of square cross-section measuring 10 centimeters in length and 1 centimeter on a side.

The heat treatment schedule consisted of two hold temperatures, namely, one for nucleation, and the other for crystallization. A standard heat treatment schedule had a heating rate of 100°C per hour to a temperature in the range of 815° to 835°C, followed by a 1-hour hold. Heating was then continued to 950°C at a 25°C rise per hour (sintering can occur at this time) and from that temperature to 1150°C over a 2-hour period, where the samples were then held for 5 hours.

TABLE A

PHYSICAL, THERMAL AND STRUCTURAL PROPERTIES OF TEST SAMPLES

| Example | Batch Formulations | | | Agent | | % Shrinkage | Flexural Strength | CTE RT-600°C Vertical | CTE RT-600°C Orton | Relative Cordierite Content |
|---|---|---|---|---|---|---|---|---|---|---|
| | MgO | $Al_2O_3$ | $SiO_2$ | Type | Wt.% | | | | | |
| 1 | 13.8 | 34.9 | 51.4 | — | — | 1.8 | 2440 | 1.35 | 1.60 | 98 |
| 2 | 13.8 | 34.9 | 51.4 | $TiO_2$ | 1.5 | 2.4 | 2530 | 1.23 | 1.46 | 100 |
| 3 | 13.8 | 34.9 | 51.4 | LiF | 0.5 | 4.2 | 4940 | 1.39 | — | 98 |
| 4 | 13.8 | 34.9 | 51.4 | $Cr_2O_3$ | 1.0 | 6.3 | 5970 | 2.93 | 3.21 | 55 |
| 5 | 13.8 | 34.9 | 51.4 | $Nb_2O_5$ | 1.0 | 3.7 | 4370 | 1.32 | 1.46 | 97 |
| 6 | 13.8 | 34.9 | 51.4 | $ZrO_2$ | 1.0 | 4.5 | 6140 | 1.30 | 1.54 | 95 |
| 7 | 13.8 | 34.9 | 51.4 | $MoO_3$ | 1.0 | 5.4 | 5960 | 1.30 | 1.39 | 97 |
| 8 | 13.8 | 34.9 | 51.4 | $TiO_2$ | 6.0 | 2.6 | 1550 | 6.50 | — | 19 |
| 9 | 13.8 | 34.9 | 51.4 | $TiO_2$ | 10.0 | 10.0 | 2480 | 3.61 | — | 44 |

Firing shrinkage, rate of thermal expansion and flexural strength were determined for each example. Firing shrinkage was determined by measuring the percent change in length. Bulk density and porosity were determined by the ASTM boiling water method C 20. The coefficient of thermal expansion (CTE) was determined over a temperature range of room temperature (RT) to 600°C on both a vertical dilatometer with a vitreous silica push rod and sample holder at a heating rate of 160°C per hour, and on a horizontal Orton automatic recording dilatometer, also with a vitreous silica push rod and sample holder at a heating rate of 160°C per hour. The Orton determination of the coefficient of thermal expansion is more reliable than the vertical dilatometer determination, but the former is also much more time consuming. Use of both techniques was made in collecting the data, the vertical dilatometer being employed more as a screening device. Flexural strength data of Table A were determined on an Instron tester by a three-point loading on a 2.5 inch span.

The cordierite content was determined by standard X-ray diffraction technique in which the intensity of peaks was compared with a known, standard material. Crystalline substances such as cordierite exhibit a distinctive group of X-ray diffraction peaks in which the angle that each peak occurs is dictated by the internal structure of the mineral. The intensity of these peaks is proportional to the amount of the crystalline phase present in the sample. When a standard is used, the amount of a crystal phase in a sample can be calculated using peak intensities in relation to the intensities of the standard peaks. It is necessary therefore to use standards of known crystal phase content. It has not been possible to obtain a cordierite standard where the absolute cordierite content is known. This is because, if the sample is prepared by recrystallization of a glass having a chemical composition close to that of cordierite, there is always some residual glass, the amount of which is not accurately known. Samples having the highest amount of cordierite are either described herein or have been obtained by prolonged heat treatment or both. Extended heat treatments, however, also result in the initiation of the structural inversion from the hexagonal crystal structure to the orthorhombic crystal structure. This change in structure results in changes in the angles where the X-ray diffraction peaks occur and also in changes in the intensities of those peaks.

The cordierite content as used herein was, therefore, determined by comparing the cordierite X-ray diffraction peak intensities of a group of experimental samples and assigning a value of 100 to that sample with an intense cordierite peak, namely, that of Example 2. The compositions of other examples subsequently analyzed were, in turn, compared to this example. These values, then, indicate the relative amounts of cordierite by weight as detected by X-ray diffraction. However, all data to indicate that all cordierite-type glass-ceramics prepared in accordance with the present invention did contain at least 80% by weight of cordierite as $2MgO \cdot 2Al_2O_3 \cdot nSiO_2$, where $n$ is a whole number in the range of 5 to 8.

As shown by Table A, within the amounts of nucleating agent that are contemplated by the present invention, there were minor differences in shrinkage, strength, coefficients of thermal expansion, and cordierite content, with each formulation showing slightly different trends. All of the nucleating agents of the invention provided excellent coefficients of thermal expansion of less than $1.60 \times 10^{-6}$ inch/inch/°C on the Orton dilatometer. It will be noted that the coefficient of thermal expansion for Example 1, which contained no nucleating agent was $1.60 \times 10^{-6}$ inch/inch/°C from room temperautre (RT) to 600°C on the horizontal (Orton) dilatometer. All of the other formulations containing a nucleating agent of the present invention at amounts less than 3% provided coefficients of thermal expansion less than $1.6 \times 10^{-6}$ inch/inch/°C over the same temperature range as determined by the Orton dilatometer.

Example 4 is included to show the adverse effect of adding a metal compound not in accordance with the invention. In this case, an addition of 1% by weight of $Cr_2O_3$ results in coefficients of thermal expansion of $2.93 \times 10^{-6}$ inch/inch/°C by the vertical dilatometer; and $3.21 \times 10^{-6}$ inch/inch/°C by the Orton dilatometer.

Examples 8 and 9 are included to show the effect of adding more than 3% by weight of a nucleating agent. These examples are representative of the amounts of added agents used by the prior art. In Example 8, the addition of 6% $TiO_2$ resulted in a coefficient of thermal expansion of $6.50 \times 10^{-6}$ inch/inch/°C by the vertical dilatometer. In Example 9, the addition of 10% $TiO_2$ resulted in a coefficient of thermal expansion of $3.61 \times 10^{-6}$ inch/inch/°C by the vertical dilatometer.

EXAMPLES 10 THROUGH 21

Table B provides batch formulations for 12 additional examples and the test results on the glass-ceramics prepared from the formulations.

These formulations were smelted together with the indicated nucleating agent and test samples prepared from the resulting glasses in the same manner as described for Examples 1 through 9. In Table B, the values indicated correspond to those described for Table A. It will be noted that the values reported are within desirable ranges and especially the coefficients of thermal expansion which are less than $1.60 \times 10^{-6}$ inch/inch/°C as determined by Orton and vertical dilatometers.

Although the foregoing describes several embodiments of the present invention, it is understood that the present invention may be practiced in still other forms within the scope of the following claims.

TABLE B

PHYSICAL, THERMAL AND STRUCTURAL PROPERTIES OF TEST SAMPLES

| Example | Batch Formulations | | | Agent | | % Shrinkage | Flexural Strength | CTE RT-600°C Vertical | CTE RT-600°C Orton | Relative Cordierite Content |
|---|---|---|---|---|---|---|---|---|---|---|
| | MgO | $Al_2O_3$ | $SiO_2$ | Type | Wt.% | | | | | |
| 10 | 13.8 | 34.9 | 51.4 | $TiO_2$ | 2.5 | 1.5 | 830 | 1.11 | 1.11 | 105 |
| 11 | 13.8 | 34.9 | 51.4 | $TiO_2$ | 0.8 | 6.0 | 5240 | 1.02 | 1.18 | 113 |
| 12 | 13.8 | 34.9 | 51.4 | $MoO_3$ | 0.5 | 3.0 | 3900 | 1.03 | 1.29 | 107 |
| 13 | 13.8 | 34.9 | 51.4 | $MoO_3$ | 2.0 | 4.5 | 4560 | 1.23 | — | 105 |
| 14 | 13.8 | 34.9 | 51.4 | $Nb_2O_5$ | 0.5 | 5.0 | 4560 | 1.04 | — | 111 |
| 15 | 13.8 | 34.9 | 51.4 | $Nb_2O_5$ | 1.0 | 3.0 | 3790 | 1.03 | 1.13 | 108 |
| 16 | 13.8 | 34.9 | 51.4 | $Nb_2O_5$ | 2.0 | 2.5 | 3110 | 1.03 | — | 95 |
| 17 | 13.8 | 34.9 | 51.4 | $ZrO_2$ | 0.5 | 7.0 | 5940 | 1.20 | — | 108 |
| 18 | 13.8 | 34.9 | 51.4 | $ZrO_2$ | 2.0 | 10.0 | 7550 | 1.41 | — | 93 |
| 19 | 13.8 | 34.9 | 51.4 | LiF | 1.0 | 5.0 | 3970 | 1.22 | — | 112 |
| 20 | 13.8 | 34.9 | 51.4 | $Ta_2O_5$ | 1.0 | 6.1 | 3000 | 1.16 | — | 102 |

TABLE B-continued

| | PHYSICAL, THERMAL AND STRUCTURAL PROPERTIES OF TEST SAMPLES | | | | | | | | | |
|---|---|---|---|---|---|---|---|---|---|---|
| | Batch Formulations | | | Agent | | % | Flexural | CTE RT-600°C | CTE RT-600°C | Relative Cordierite |
| Example | MgO | Al$_2$O$_3$ | SiO$_2$ | Type | Wt.% | Shrinkage | Strength | Vertical | Orton | Content |
| 21 | 13.8 | 34.9 | 51.4 | As$_2$O$_3$ | 1.0 | 5.8 | 4500 | 1.13 | — | 107 |

We claim:

1. In a process for producing a cordierite glassceramic by fusing a mixture of ingredients to form a melt consisting essentially of MgO, Al$_2$O$_3$, and SiO$_2$, quenching the melt to a solid glass, and then heating the solid glass to crystallize such oxides to a cordierite crystalline structure in the presence of a glassy phase; the improvement of increasing the amount of cordierite crystalline structure formed and reducing the amount of glassy phase obtained, comprising: admixing with said mixture or glass at any time prior to such heating step a nucleating agent in a relatively small amount of about 0.5% to about 3%, based on the weight of said solid glass, said agent consisting essentially of a metal compound, the metal of said compound being selected from a class consisting of Mo, Ta, Zr, Nb, Ti, Li, As and mixtures thereof, and said compound of the metal being selected from the class consisting of the metal itself, an oxide of the metal, a compound convertible to the oxide by heat, and lithium fluoride, comminuting said solid glass to an average particle size no greater than about minus 325 U.S. Standard sieve to provide substantially increased surface area, heating said particles and nucleating agent to a nucleating temperature and forming a plurality of sites for crystallization of said comminuted glass to a cordierite glass-ceramic by the combination of said relatively small amount of nucleating agent and said increased surface area, and then heating the particles and agent at a higher temperature to promote crystallization and form a cordierite glass-ceramic containing at least 80% by weight of a cordierite crystalline structure corresponding to 2MgO.2Al$_2$O$_3$.$n$SiO$_2$, $n$ being a whole number within the range of 5 to 8, said glass-ceramic having a coefficient of thermal expansion less than $1.60 \times 10^{-6}$ inch/inch/°C from room temperature to 600°C as determined by the Orton dilatometer.

2. The process of claim 1 in which said cordierite crystalline structure corresponds to 2MgO.2Al$_2$O$_3$.5SiO$_2$.

3. The process of claim 1 in which said metal compound is Nb$_2$O$_5$.

4. The process of claim 1 in which said nucleating temperature is in the range of about 700° to about 900°C, and said time is about 1 hour to about 4 hours.

5. The process of claim 1 in which said nucleating agent is added to said ingredients prior to forming said melt.

6. The process of claim 1 in which said heating at a higher temperature includes heating from about 1050° to about 1425°C for about 0.5 hour to about 6 hours.

7. The process of claim 1 including forming a desired shape from the glass particles prior to heating to said nucleating temperature.

8. The process of claim 1 in which the metal of said nucleating agent is Ti, Nb, Mo, or Zr, said amount of the nucleating agent is about 0.5% and said coefficient of thermal expansion is no greater than $1.54 \times 10^{-6}$ inch/inch/°C from room temperature to 600°C.

* * * * *